Feb. 10, 1959     R. L. BERGESON     2,872,811
REFUELING APPARATUS Filed Nov. 3, 1954     5 Sheets-Sheet 2

FIG. 2 — FUEL REMAINING OPERATION

FIG. 3 — FUEL DELIVERED OPERATION

FIG. 4 — FUEL TO BE DELIVERED OPERATION

INVENTOR
RAYMOND L. BERGESON

BY George H. Fisher

ATTORNEY

FUEL REMAINING OPERATION

INVENTOR
RAYMOND L. BERGESON

Feb. 10, 1959   R. L. BERGESON   2,872,811
REFUELING APPARATUS
Filed Nov. 3, 1954   5 Sheets-Sheet 4

FUEL DELIVERED OPERATION

FUEL TO BE DELIVERED OPERATION

INVENTOR
RAYMOND L. BERGESON
BY George H. Fisher
ATTORNEY

United States Patent Office 2,872,811
Patented Feb. 10, 1959

2,872,811

REFUELING APPARATUS

Raymond L. Bergeson, St. Paul, Minn., assignor to Minneapolis-Honeywell Regulator Company, Minneapolis, Minn., a corporation of Delaware Application November 3, 1954, Serial No. 466,609

11 Claims. (Cl. 73—304)

The present invention is concerned with an in-flight refueling apparatus for use with tanker type aircraft.

Such an apparatus is of particular importance with the advent of the tanker type aircraft, which aircraft carries a relatively large quantity of aviation fuel and refuels other aircraft while airborne. Such a tanker type aircraft includes means, such as pumping means, for causing the fuel to be transferred from its fuel storage tanks to the other aircraft, which means can be controlled automatically or can be controlled manually by a member of the crew of the tanker aircraft. It can be seen that unless the pumping means is accurately controlled, too large a quantity of fuel may be delivered to the aircraft being refueled with possible disastrous results.

It is therefore the object of the present invention to provide supervisory apparatus for use with fluid storage means which apparatus has manually operable means to cause an indicator to indicate the fluid remaining in the fluid storage means, the fluid delivered from the fluid storage means, and/or the fluid to be delivered from the fluid storage means all on a simple indicator dial with no subtraction, addition, etc.

It is a further object of the present invention to provide supervisory apparatus for use with a tanker type craft which has fuel storage means, the apparatus consisting of means to derive a signal of a first sense indicative of the fuel in the storage means, and a further source of voltage having manually operable means and arranged to provide a signal of the opposite sense and under the control of the manually operable means to cause an indicating means to selectively indicate the fuel remaining, the fuel delivered, or the fuel to be delivered.

These and other objects of the present invention will become apparent upon reference to the following specification, claims, and drawings of which

Figure 9 is a showing of a third modification of the present invention. As pointed out above, the present invention is for use with fluid storage means. More particularly, the present invention is for use with a tanker type aircraft. In a tanker type aircraft, it is desirable to be able to read the fuel remaining in the fuel tanks, the fuel which has been delivered to the aircraft being refueled, or the fuel which is to be delivered to the aircraft being refueled. The present invention contemplates providing an electrical signal of a first sense and of a magnitude dependent upon the total fuel quantity in the fuel storage means. A signal of the opposite sense is connected in opposition to the quantity signal and the two signals are fed to an amplifier which controls a motor which in turn controls the magnitude of the second electrical signal and controls as indicator.

When the apparatus is used in the fuel delivered mode of operation, the polarity of the opposing signal is reversed as are the motor connections and a further source of signal is added in series with the opposing signal. The magnitude of the second signal is adjusted to cause the indicator to move to the zero fuel quantity position and to subsequently indicate the fuel quantity which is withdrawn from the fuel storage means.

In the fuel to be delivered mode of operation of the apparatus, the polarity of the opposing signal is returned to the original polarity, as are the motor connections, and by adjustment of the further source of signal the indicator is made to read a predetermined quantity of fuel less than the actual fuel in the fuel storage means and to subsequently indicate decreasing quantities of fuel as the fuel is withdrawn from the fuel storage means.

Figure 1:
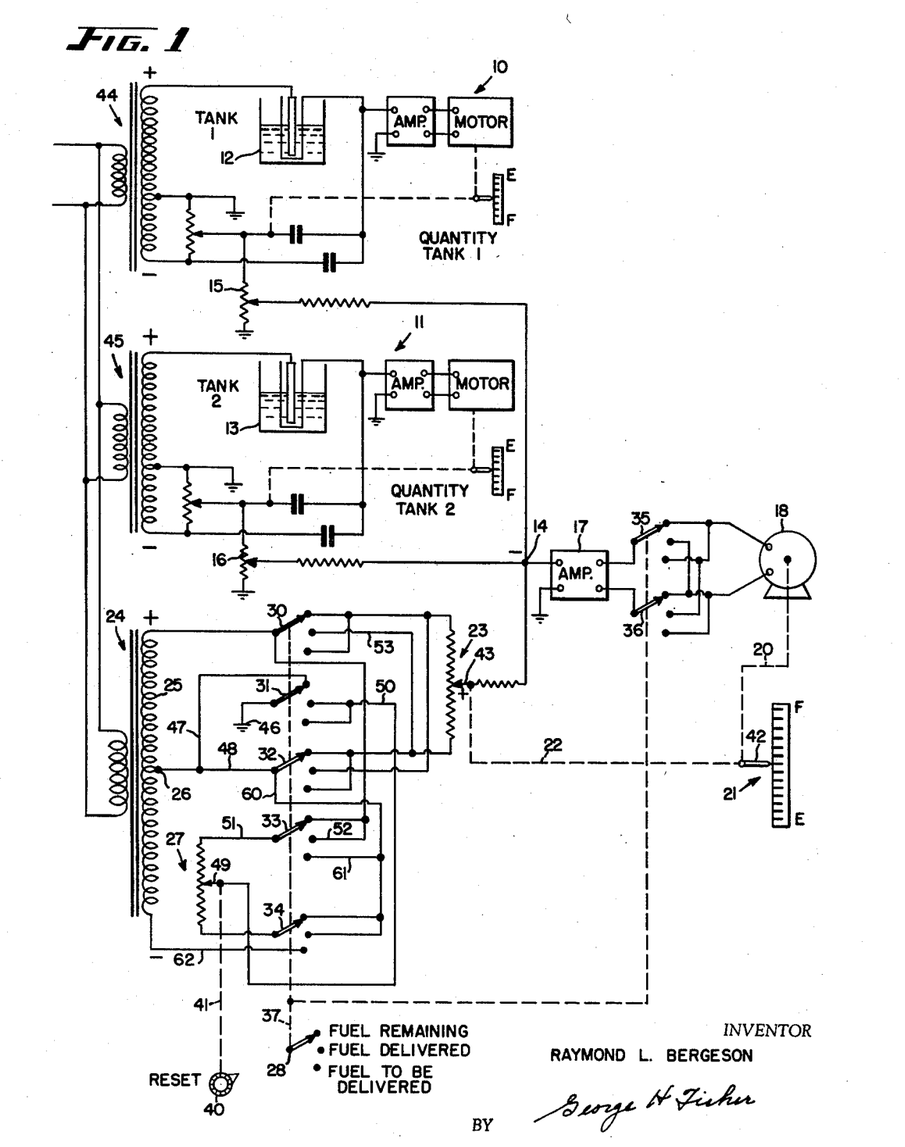
Figure 1 is a schematic showing of a first modification of the present invention.

Referring now specifically to Figure 1, the reference numerals 10 and 11 respectively designate two fuel quantity measuring systems associated with the fuel tanks 12 and 13, which fuel tanks may be located in a tanker type aircraft. The fuel quantity measuring systems 10 and 11 are of the same general type disclosed in the copending John W. Bancroft application Serial No. 181,747, filed August 28, 1950, now Patent 2,793,529.

The quantity measuring systems 10 and 11 operate such as to provide an alternating current signal of a first phase and of a magnitude indicative of the quantity of fuel in the tanks 12 and 13 respectively. These signals are applied to potentiometers 15 and 16 and then from the potentiometer wipers to a terminal 14.

Connected to terminal 14 is the input of an amplifier 17 which has its output connected by means of switching means to be later described to a reversible motor 18. Amplifier 17 is an amplifier of the general type shown in the Albert P. Upton Patent 2,423,534. Amplifier 17 is sensitive to both the phase and the magnitude of the signal applied to the input of the amplifier. The output of amplifier 17 is a voltage of a first or a second sense depending upon the phase of the voltage applied to the input of the amplifier.

Motor 18 is connected by means of mechanical linkage 20 to a pointer 42 of an indicator 21, which indicator is calibrated in terms of fuel quantity. Motor 18 is also connected by means of mechanical linkages 20 and 22 to control the position of a movable tap 43 of a potentiometer designated generally by the reference numeral 23.

A transformer designated generally by the reference numeral 24 is also provided and has a secondary 25 having a tap 26.

Connected in circuit with the secondary 25 is a second potentiometer designated generally by the reference numeral 27.

A first manually operable means 28 is provided and as can be seen, this manually operable means has three positions of operation, namely fuel remaining, fuel delivered, and fuel to be delivered. Manually operable means 28 controls a plurality of switch blades 30 through 36 by means of mechanical linkage 37. Associated with each of the switch blades 30 through 36 are three stationary contacts corresponding to the three positions of operation of the manually operable means 28.

A second manually operable means 40 is provided and is designated reset. The manually operable means 40 controls the position of a movable tap 49 of potentiometer 27 by means of a mechanical linkage 41.

The general operation of the present invention is such that a voltage is applied from the movable tap 43 of potentiometer 23 to terminal 14 to oppose the voltage applied from the fuel quantity measuring systems 10 and 11. The operation of motor 18 and the indication which is given on indicator 21 is controlled by operation of the two manually operable means 28 and 40. The operation of the present invention can best be considered by assuming that a signal of a first phase applied to the input of amplifier 17 will cause motor 18 to rotate in a direction to cause pointer 42 and tap 43 to both move in a downward direction so long as the output of amplifier 17 is connected to motor 18 in the manner shown in Figure 1. It will be observed that operation of the first manually operable means 28 to the fuel remaining or to the fuel to be delivered position does not change the connection of the output of amplifier 17 to motor 18 whereas the operation of manually operable means 28 to the fuel delivered position causes the connection of motor 18 to the output of amplifier 17 to be reversed. This last mentioned mode of operation causes the reverse operation of the motor, in other words, a signal of a first phase present at the input of amplifier 17 causes the motor 18 to rotate in such a direction as to cause the pointer 42 and the tap 43 to move in an upward direction.

The fuel tanks 12 and 13 have been shown half full and therefore with the manually operable means 28 in the fuel remaining position, as shown in Figure 1, indicator 21 indicates the half full condition. If it is assumed that at any given instant the voltage at terminal 14 due to quantity measuring systems 10 and 11 is negative, it can be shown that the voltage present at tap 43 of potentiometer 23 is of a phase which can be called a positive voltage. The voltage designation shown on the secondaries of transformers 44, 45, and 24 are such as to cause these conditions to exist.

Figure 2:
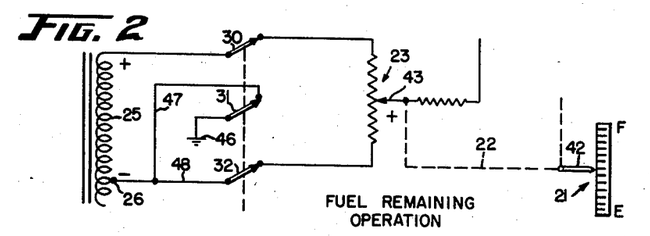
Figures 2, 3 and 4 are showings of a portion of the apparatus of Figure 1 in the three modes of operation of the apparatus as selected by a manually operable means.

Referring to Figure 2, positive voltage on wiper 43 can be shown by tracing a circuit from ground connection 46 through contact blade 31, conductor 47, conductor 48, contact blade 32, and through a voltage rise in the resistance element of potentiometer 23 to the movable tap 43. It can be seen that with manually operable means 28 in the fuel remaining position the resistance element of potentiometer 23 is connected by means of switch blades 30 and 32 to the upper terminal and to the tap 26 of secondary 25. This places a voltage on the resistance element of potentiometer 23 which is effectively a voltage rise in the above traced circuit and places a voltage of the same phase which can be called a positive voltage on terminal 14 to oppose the negative voltage on terminal 14 supplied by the quantity measuring systems 10 and 11. Amplifier 17 is effective through motor 18 to position tap 43 to the position where these voltages are equal and the voltage applied to the input of amplifier 17 is reduced substantially to zero.

As fuel is subsequently withdrawn from the tanks 12 and 13, the magnitude of the negative signal applied to terminal 14 will decrease and a positive signal is effectively applied to the input of amplifier 17. This positive signal causes motor 18 to rotate in a direction to move both indicator pointer 42 and tap 43 in a downward direction to indicate a lesser quantity of total fuel and to reduce the positive signal applied to terminal 14 from tap 43.

If the operator on the tanker aircraft now wishes to set indicator 21 to the zero quantity position so that the indicator will subsequently read the fuel withdrawn from the tanks 12 and 13, he switches the manually operable means 28 to the fuel delivered position.

As above mentioned, switch blades 35 and 36 in the center position cause motor 18 to be connected in a reverse manner to the output of amplifier 17.

Switch blades 30 and 32 in the center position cause the resistance element of potentiometer 23 to be connected in a reverse manner to the upper terminal and tap 26 of transformer secondary 25, as can be seen in Figure 2. In other words, the upper terminal of the resistance element of potentiometer 23, which was connected to the upper terminal of the secondary 25, is now connected to the tap 26, and the lower terminal of the resistance element of potentiometer 23 is connected to the upper terminal of the secondary 25.

Switch blades 33 and 34 connect the upper terminal of the resistance element of potentiometer 27 to the upper terminal of secondary 25 and the lower terminal of the resistance element to the tap 26.

Switch 31 connects the movable tap 49 to the ground or reference potential 46.

While the apparatus shown in Figure 1, in balance, with no voltage applied to amplifier 17, when manually operable means 28 is moved to the fuel delivered position, the voltage applied to the input of amplifier 17 becomes a negative voltage. This can be seen by tracing the circuit from ground connection 46 through switch blade 31, conductor 50, movable tap 49 of potentiometer 27 through a voltage rise to conductor 51, switch blade 33, conductor 52, switch blade 30, conductor 53, and through a voltage drop in the lower portion of the resistance element of potentiometer 23 to the potentiometer tap 43. In this circuit it can be seen that the voltage on the upper portion of the resistance element of potentiometer 27 is connected in opposition to the voltage on the lower portion of the resistance element of potentiometer 23. In the above traced circuit the voltage across the upper portion of the resistance element of potentiometer 27 is a voltage rise while the voltage across the lower portion of the resistance element of potentiometer 23 is a voltage drop. This lowers the value of the positive voltage present on tap 43. Since the system was in balance when manually operable means 28 was in the fuel remaining position, the system is now unbalanced to supply a negative voltage to amplifier 17. Due to the reverse connection of motor 18 to the output of amplifier 17 by switch blades 35 and 36, the negative voltage applied to the input of amplifier 17 now causes indicator pointer 42 and movable tap 43 to move in a downward direction. This downward movement continues until the positive voltage present on movable tap 43 of potentiometer 23 is equal to the negative voltage supplied to terminal 14 by quantity indicating means 10 and 11.

Figure 3:
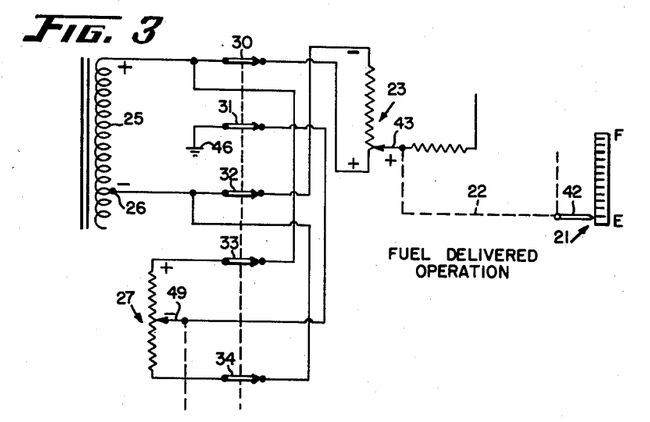

The extent of this movement can be controlled by the second manually operable means 40 which controls the voltage supplied in the above traced circuit by the upper portion of the resistance element of potentiometer 27. When the voltage rise supplied in the above traced circuit by the upper portion of the resistance element of potentiometer 27 is equal to the negative voltage supplied to terminal 14 by means of quantity indicating systems 10 and 11, the motor 18 will move indicating pointer 42 to the empty position as shown in Figure 3 and the wiper 43 associated with potentiometer 23 will be at the lower limit of its range as shown in Figure 3.

If fuel is subsequently withdrawn from tanks 12 and 13, the negative signal applied to terminal 14 will be reduced and a positive signal will effectively be applied to the input of amplifier 17. This causes amplifier 18 to rotate in a manner to move indicating pointer 42 and potentiometer tap 43 in an upward direction. Pointer 42 indicates the amount of fuel which is delivered from the tanks 12 and 13 while movable tap 43 in moving in an upward direction places a voltage drop in series with the voltage rise present on the upper portion of the resistance element of potentiometer 27 to thereby cause the signal input of amplifier 17 to be substantially reduced to zero.

Another mode of operation which is desirable is for the operator in the tanker type aircraft to be able to set the indicator 21 to a predetermined position which indicates the amount of fuel which it is desired to subsequently deliver to the aircraft being refueled. This is accomplished by moving the manually operable means 28 to the fuel to be delivered position. In this position, movable switch blades 35 and 36 again connect motor 18 to the output of amplifier 17 in the first mentioned manner, that is, the manner in which it is connected when manually operable means 28 is in the fuel remaining position. Therefore, in the fuel to be delivered position, as in the fuel remaining position, a negative signal applied to the input of amplifier 17 causes motor 18 to rotate in a direction to cause indicating pointer 42 and potentiometer tap 43 to move in an upward direction.

Figure 4:
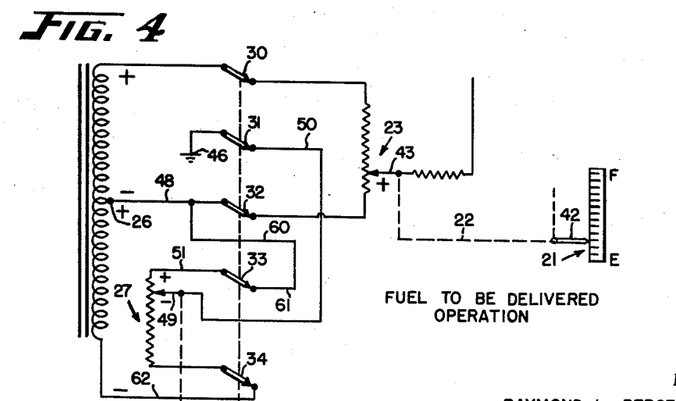

Switch blades 30 and 32 in the third or fuel to be delivered position once again connect the resistance element of potentiometer 23 in the first mentioned manner to the upper terminal and to the tap of secondary 25, as can be seen in Figure 4. In other words, the upper terminal of the resistance element of potentiometer 23 is again connected to the upper terminal of secondary 25 while the lower terminal of the resistance element is connected to the tap 26 of the secondary.

Switch blades 33 and 34 in the fuel to be delivered position connect the resistance element of potentiometer 27 to the tap 26 and to the lower terminal of the secondary 25. This can be seen by tracing a circuit from tap 26 through conductor 48, conductor 60, conductor 61, switch blade 33, conductor 51, resistance element of potentiometer 27, switch blade 34, and conductor 62 to the lower terminal of secondary 25. This manner of connection is shown in Figure 4.

In this mode of operation, the voltage present on the lower portion of the resistance element of potentiometer 23 is connected in series aiding relationship to the voltage present on the upper portion of the resistance element of potentiometer 27. This can be seen by tracing a circuit from ground connection 46 through switch blade 31, conductor 50, movable tap 49 through a voltage rise in the upper portion of the resistance element of potentiometer 27, conductor 51, switch blade 33, conductor 61, conductor 60, switch blade 32, and through a voltage rise in the lower portion of the resistance element of potentiometer 23 to potentiometer tap 43. It can be seen from this above traced circuit that the voltage on the upper portion of the resistance element of potentiometer 27 is a voltage rise and is connected in series with the voltage rise on the lower portion of the resistance element of potentiometer 23. In a balanced condition, the sum of these two voltage rises are equal to the negative voltage applied to terminal 14 from quantity indicating systems 10 and 11.

If it is assumed that the system as shown in Figure 1, which is connected to the fuel remaining mode of operation and is in balance, is switched to the fuel to be delivered mode of operation, the net voltage applied to the input of amplifier 17 will be a positive voltage. This will cause motor 18 to operate and move indicating pointer 42 and potentiometer tap 43 in a downward direction. The extent of movement in the downward direction is controlled by the position of manually operable means 40 which controls the position of tap 49 of potentiometer 27. The operator aboard the tanker type aircraft positions manually operable means 40 to the position which causes the indicating pointer 42 to indicate the desired quantity of fuel to be subsequently delivered to the aircraft to be refueled.

Such a condition is shown in Figure 4 where potentiometer tap 49 is positioned such as to cause indicating pointer 42 to indicate approximately one-quarter full. As fuel is subsequently withdrawn from tanks 12 and 13 the negative voltage applied to terminal 14 from the quantity sensing systems 10 and 11 will decrease and a positive voltage will effectively be applied to the input of amplifier 17 to cause motor 18 to move indicating pointer 42 and potentiometer wiper 43 in a downward direction. When the potentiometer wiper 42 has reached the empty condition the operator knows that the predetermined amount of fuel has been delivered to the aircraft being refueled and the pumping operation can be stopped, either manually or automatically.

Figure 5:
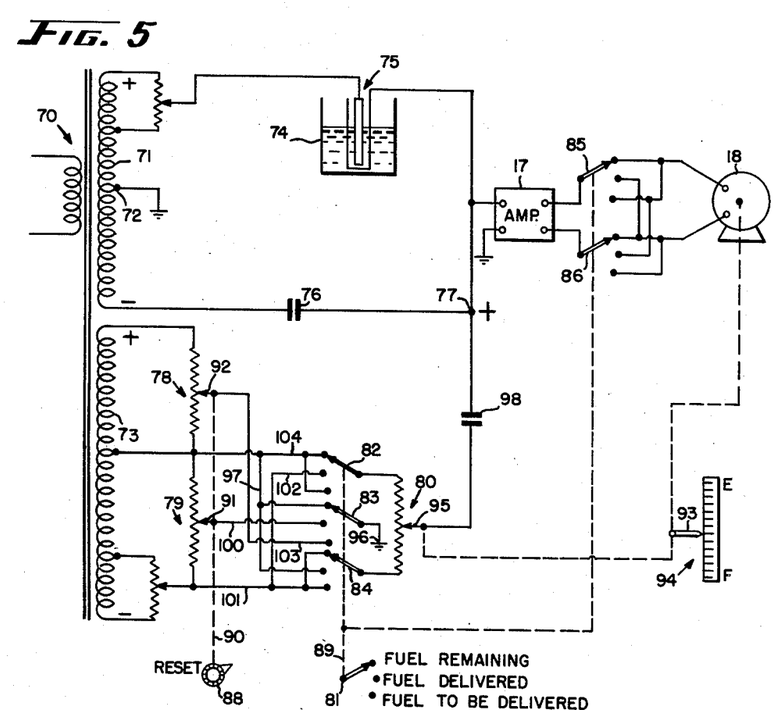
Figure 5 is a showing of a second modification of the present invention.

Figure 5 is a showing of a modification of the present invention utilizing the same general principles as the apparatus of Figure 1.

Referring specifically to Figure 5, a transformer 70 is provided having a first secondary 71 having a tap 72 and having a second secondary 73. The polarity of voltage on the end terminals of the secondaries 71 and 73 has been arbitrarily designated for purposes of explanation.

A fuel tank 74 is shown which may be located in a tanker type aircraft. Located within the fuel tank 74 is a capacitance type sensing probe 75 which may be of the general type disclosed in the LeRoy A. Griffith Patent 2,563,281. This capacitive probe senses the amount of fuel in the tank 74 since the capacity of the probe varies with the amount of fuel in the tank. The capacitive probe 75 is connected into one leg of a capacitor bridge. The other leg of the capacity bridge includes a capacitor 76. The capacity of the capacitor 76 may be made equal to the empty capacity of the probe 75. That is, the capacity of the probe 75 when there is no fuel in the tank 74.

The tank 74 is shown as half full and in this condition with the secondary 71 having its terminals of the polarity shown, a positive voltage is applied to a terminal 77. This voltage is of a first phase which has been arbitrarily called positive, and is of a magnitude indicative of the amount of fuel in the tank 74.

Terminal 77 is connected to the input of an amplifier 17 which may be identical to the amplifier 17 of Figure 1.

Transformer secondary 73 has connected across the end terminals thereof a first and a second potentiometer 78 and 79 respectively. A third potentiometer 80 is provided and is connected in parallel with the resistance element of potentiometer 79 by switching means to be described. A first manually operable means 81 is provided and has three positions of operation, fuel remaining, fuel delivered, and fuel to be delivered, as shown in Figure 5. Manually operable means 81 controls switch blades 82 through 86 by means of a mechanical linkage 89. A second manually operable means 88, designated reset, by means of a mechanical linkage 90 controls the position of potentiometer wipers 91 and 92 of potentiometers 79 and 78 respectively.

Switch blades 85 and 86 connect the output of amplifier 17 to a motor 18 which is a reversible motor similar to the motor 18 of Figure 1. It will be noted in Figure 5 that switch blades 85 and 86 in the fuel delivered position reverse the connection of the motor 18 to the output of amplifier 17. This is for the reason described in connection with Figure 1. Motor 18 controls indicating pointer 93 of an indicator designated generally by the reference numeral 94 and also controls movable tap 95 of potentiometer 80.

As shown in Figure 5, the output of amplifier 17 is connected in a first manner to motor 18 when switch blades 85 and 86 are in the fuel remaining or fuel to be delivered positions. It will be assumed that when a voltage of a second phase opposite to the first phase, which will be arbitrarily called a negative voltage, is applied to the input of amplifier 17, the motor 18 rotates in a direction to cause indicating pointer 93 and potentiometer tap 95 to move in an upward direction.

Referring specifically to the fuel remaining mode of operation of the apparatus of Figure 5, the voltage present on potentiometer wiper 95 must be of a negative voltage to balance out the voltage present at terminal 77 due to the quantity of fuel in tank 74. With first manually operable means 81 in the fuel remaining position, the switch blades 84 and 82 connect the resistance element of potentiometer 80 in parallel with the resistance element of potentiometer 79. This connection can be seen more clearly in Figure 6 and it can be seen that because of this connection a positive voltage is placed on the upper terminal of the resistance element of potentiometer 80.

Figure 6:
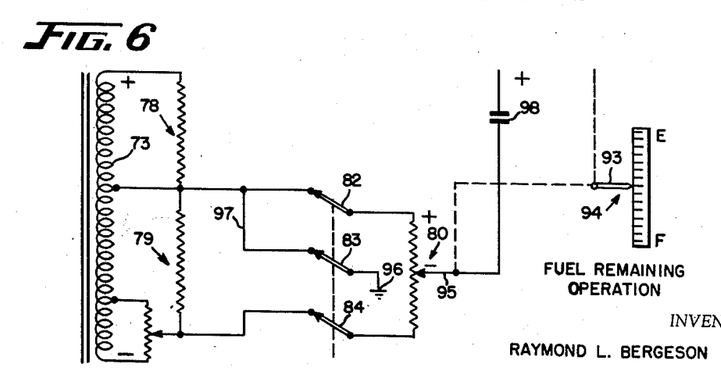
Figures 6, 7 and 8 are showings of a portion of the apparatus of Figure 5 showing the three modes of operation of the apparatus as selected by a manually operable means.

A circuit can now be traced from ground connection 96 through switch blade 83, conductor 97, switch blade 82, the upper portion of the resistance element of potentiometer 80, through a voltage drop to potentiometer wiper 95, and capacitor 98, to terminal 77. This last mentioned circuit supplies a negative voltage to the terminal 77 and motor 18 causes potentiometer wiper 95 to be positioned to the point where this negative voltage is substantially equal and opposite to the positive voltage applied to terminal 77 from the capacity bridge. In this condition, indicating pointer 93 indicates half full or the fuel remaining in the tank 74.

If it is now desired to set the indicating pointer 93 to the zero quantity indication so that it will subsequently indicate the fuel withdrawn from tank 74, the operator in the tanker type aircraft moves the manually operable means 81 to the fuel delivered position. With means 81 in the center position, the switch blades 85 and 86 reverse the connection of the motor 18 to the output of amplifier 17 so that now a negative input signal to the input of amplifier 17 will cause the motor 18 to move indicating pointer 93 and potentiometer tap 95 in a downward direction rather than in an upward direction.

Figure 7:
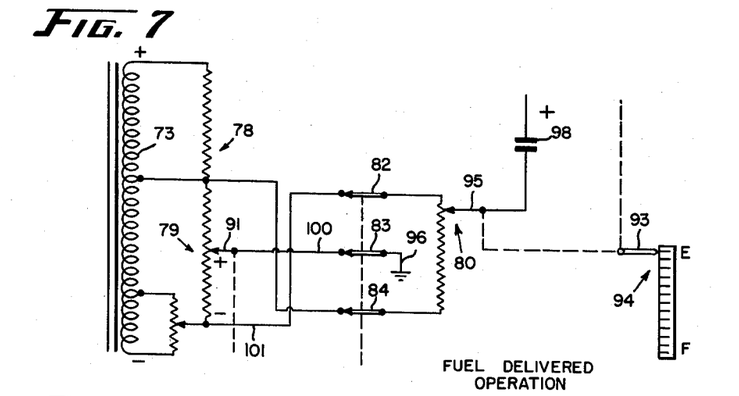

Movable switch blades 82 and 84 in the fuel delivered position reverses the connection of the resistance element of potentiometer 80 in parallel with the resistance element of potentiometer 79, as seen in Figure 7. In other words, the upper terminal of the resistance element of potentiometer 80 is now connected to the lower terminal of the potentiometer 79 while the lower terminal of the resistance element of potentiometer 80 is now connected to the upper terminal of potentiometer 79.

Switch blade 83 in the fuel delivered position connects the ground connection 96 to the movable tap 91 of potentiometer 79, as seen in Figure 7.

Again in this case, the voltage present on potentiometer tap 95 must be of a negative value to balance out the positive voltage on terminal 77 supplied by the capacity bridge.

The apparatus of Figure 5 in the fuel delivered mode of operation is shown more clearly in Figure 7. The circuit whereby a negative voltage is now applied to potentiometer wiper 95 can be seen by tracing a circuit from ground connection 96 through blade 83, conductor 100, potentiometer tap 91, through a voltage drop in the lower portion of potentiometer 79, conductor 101, and switch blade 82 to potentiometer tap 95. It can be seen that in this last traced circuit the voltage present on the lower portion of the resistance element of potentiometer 79 is a voltage drop.

The apparatus as shown in Figure 5 is connected in the fuel remaining position and is at balance. If manually operable means 81 is moved to the fuel delivered position, the voltage drop on the lower portion of the resistance element of potentiometer 79 is connected in series with the voltage on the upper portion of the resistance element of potentiometer 80. This in effect causes a positive voltage to be applied to the input of amplifier 17. This positive voltage causes motor 18 to move indicating pointer 93 and potentiometer tap 95 in an upward direction due to the fact that switch blades 95 and 96 have reversed the connection of motor 18 to the output of amplifier 17. This movement of potentiometer tap 95 and indicating pointer 93 in the upward direction will continue until a point is again reached where the negative voltage on potentiometer tap 95 is equal to the positive voltage on terminal 77 supplied by the capacity bridge. Therefore, the extent of movement of manually operable means 88 determines the movement of the indicating pointer 93 and the potentiometer tap 95. The operator can therefore move the manually operable means 88 and observe the movement of indicating pointer 93 until indicating pointer 93 reaches the empty position. This is the position as shown in Figure 7.

As fuel is subsequently withdrawn from the fuel tank 74 the positive signal applied to terminal 77 decreases. This causes a net negative signal to be applied to the input of amplifier 17 and due to the reverse connection from the output of amplifier 17 to motor 18, this causes motor 18 to move in a direction to position indicating pointer 93 and potentiometer tap 95 in a downward direction. The extent of downward movement is determined by the extent of movement of potentiometer tap 95 necessary to rebalance the system and when a new balance point has been reached indicating pointer 93 indicates the fuel which has been withdrawn from the fuel tank 74. It can be seen that since the voltage present across the upper portion of the resistance element of potentiometer 80, as the potentiometer tap 95 moves in a downward direction, is in opposition to the voltage across the lower portion of the resistance element of potentiometer 79, that downward movement of potentiometer tap 95 causes rebalance of the system.

If the operator in the tanker type aircraft now desires to set the indicating pointer 93 at a predetermined quantity of fuel which is subsequently to be delivered to an aircraft to be refueled, the manually operable means 81 is moved to the fuel to be delivered position.

Switch blades 85 and 86 in the fuel to be delivered position reconnect the motor 18 to the output of the amplifier 17 in the manner such that a negative signal to the input of amplifier 17 causes motor 18 to drive in a direction to move indicating pointer 93 and potentiometer tap 95 in an upward direction.

Figure 8:
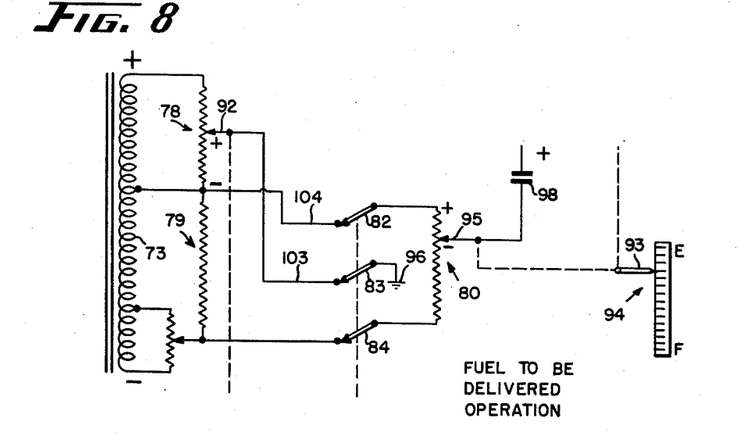

A portion of the circuit of Figure 5 with switch blades 82, 83, and 84 in the fuel to be delivered position can be seen in Figure 8. In this position, switch blades 82 and 84 connect the resistance element of potentiometer 80 such that the upper terminal is once again connected to the upper terminal of potentiometer 79 and the lower terminal thereof is once again connected to the lower terminal of potentiometer 79. Switch blade 83 in the fuel to be delivered position connects ground connection 96 to the movable tap 92 of potentiometer 78.

Here again, the voltage applied to the potentiometer wiper 95 must be of a negative value to balance out the positive voltage on terminal 77 due to the capacity bridge. The source of this negative voltage can be seen by tracing a circuit from ground connection 96 through switch blade 83, conductor 103, tap 92 of potentiometer 78, through a voltage drop in the lower portion of the resistance element of potentiometer 78, conductor 104, switch blade 82, and through a voltage drop in the upper portion of the resistance element of potentiometer 80 to potentiometer tap 95. It can be seen that in this circuit the voltage across the lower portion of potentiometer 78 is a voltage drop as is the voltage across the upper portion of the resistance element of potentiometer 80. Therefore, the sum of these two voltage drops must be equal to the positive voltage applied to the terminal 77 by the capacity bridge.

If the apparatus as shown in Figure 5, which shows the apparatus with the manually operable means 81 in the fuel remaining position and with the apparatus balanced, is switched to the fuel to be delivered position, see Figure 8, the voltage applied to the input of amplifier 17 will be a negative voltage. This causes motor 18 to be operative to move the indicating pointer 93 and the potentiometer tap 95 in an upward direction seeking a new balance point. The extent of this upward movement depends upon the position of the potentiometer tap 92. Therefore, the operator in the tanker type aircraft can control the second manually operable means 88 and observe movement of the indicating pointer 93 until this pointer indicates a quantity of fuel which it is desired to subsequently withdraw from the fuel tank 94 and deliver to an aircraft being refueled.

When fuel is subsequently withdrawn from the fuel tank 74, a negative voltage is once again applied to the input of amplifier 17 and motor 18 causes indicating pointer 93 and potentiometer tap 95 to continuously move in an upward direction until a new balance point is reached or until indicating pointer reaches the empty condition at which point the operator in the tanker type aircraft can stop the pumping operation, which pumping can also be stopped automatically by switch means cooperating with pointer 93.

Figure 9:
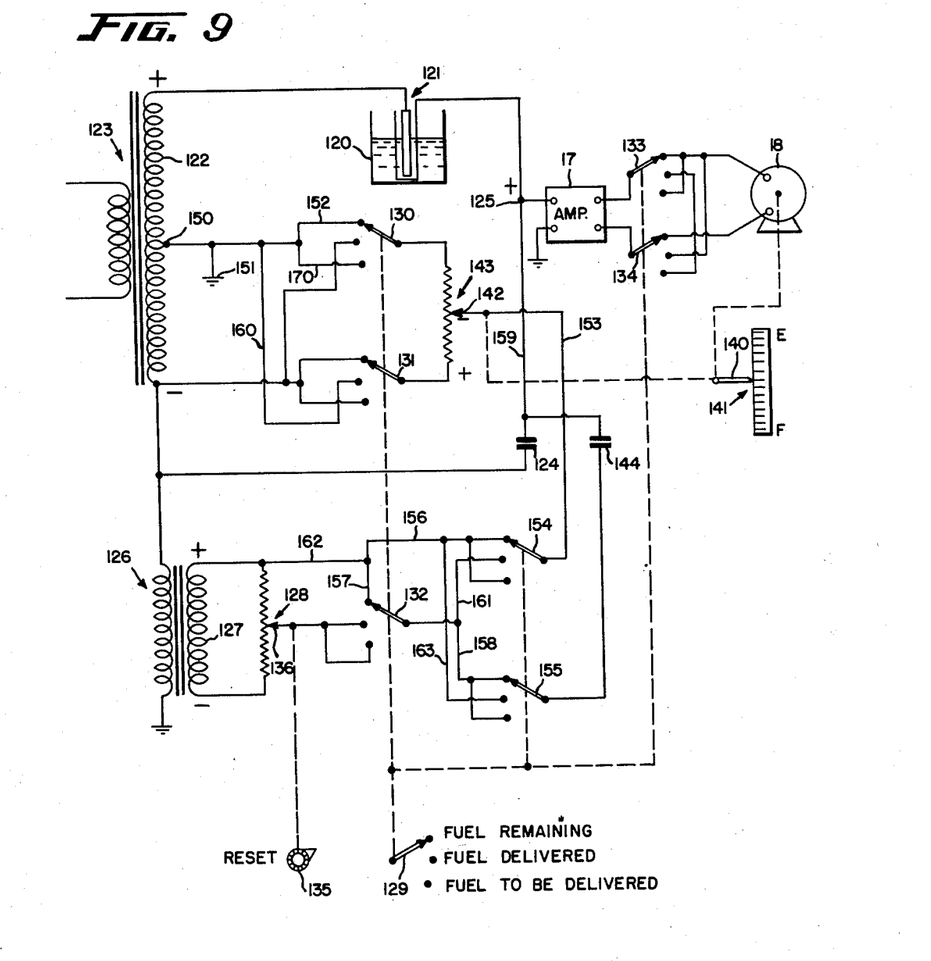

Figure 9 is a showing of a further modification of the present invention. In Figure 9 the reference numeral 120 designates a fuel tank having a capacitive type fuel quantity sensing probe 121 disposed therein. The fuel quantity sensing probe 121 is connected to the upper terminal of secondary 122 of a transformer 123. The lower terminal of the secondary 122 is connected to a capacitor 124 which, with the capacitive sensing probe 121, forms a capacity bridge to apply a voltage to terminal 125 of a first phase, called a positive voltage, and of a magnitude indicative of the quantity of fuel in the fuel tank 120. Amplifier 17 is connected to terminal 125 and has this above mentioned voltage of the first phase applied to the input thereof. Amplifier 17 is similar to the amplifier 17 of Figures 1 and 5.

A second transformer 126 is provided and has a secondary 127 with a potentiometer 128 connected across the secondary 127.

A motor 18, similar to the motor 18 of Figures 5 and 1 is connected to the output of amplifier 17 by means of switching means to be later described.

A first manually operable means 129 having three positions, fuel remaining, fuel delivered, and fuel to be delivered, is provided to control the switches 130 through 134, 154 and 155. A second manually operable means 135 is provided and is designated reset. The means 135 is connected to control the position of potentiometer tap 136 of potentiometer 128.

In explaining the operation of the apparatus of Figure 9, the secondaries of transformer 123 and 126 have been arbitrarily designated to have a certain polarity. With the polarity designated, the polarity of voltage applied to the terminal 125 from the above mentioned capacity bridge will always be of a positive value. This is true since the current through capacitor 124 in the bridge is selected to be equal to the empty current through the fuel quantity sensing probe 121. Therefore, whenever there is fuel in the tank 120 the bridge will be unbalanced to provide a positive voltage to the terminal 125 until balanced by a voltage from a capacitor 144.

The apparatus as shown in Figure 9 is now in the fuel remaining position as shown by the position of manually operable means 129. It will be assumed that with motor 18 connected to the output of amplifier 17 and with switch blades 133 and 134 in the first or fuel remaining position the motor 18 will be operable to move a pointer 140 of indicator 141 in an upward direction and to move the potentiometer tap 142 of potentiometer 143 in an upward direction when a negative signal is applied to the input of amplifier 17.

With the manually operable means 129 in the fuel remaining position, the switch blades 130 and 131 connect the resistance element of potentiometer 143 to the tap 150 and to the lower terminal of secondary 122. A circuit can now be traced from ground connection 151 through conductor 152, switch blade 130, through a voltage drop in the upper portion of the resistance element of potentiometer 143, conductor 153, switch blade 154, conductor 156, conductor 157, switch blade 132, conductor 158, switch blade 155, capacitor 144, and conductor 159 to terminal 125. It can be seen from this circuit that the voltage present across the upper portion of the resistance element of potentiometer 143 is a voltage drop and that this voltage drop is applied to terminal 125 through capacitor 144.

The apparatus of Figure 9 is shown at balance, that is, the negative voltage applied to terminal 125 by means of the above traced circuit is equal to the positive voltage applied to terminal 125 from the capacity bridge. If it is now assumed that fuel is withdrawn from tank 120, the positive signal applied to terminal 125 from the capacity bridge will decrease. This causes a negative signal to be applied to the input of amplifier 17 and motor 18 will be actuated to position indicating pointer 140 and potentiometer tap 142 in an upward direction. This movement in the upward direction will continue until the negative voltage applied to terminal 125 has been reduced to a value equal to the positive voltage applied to the terminal 125. In this condition the indicating pointer 140 will again indicate the fuel remaining in the tank 120.

If the operator in the tanker type aircraft now desires to set indicating pointer 140 to the zero indication so that he may subsequently read the fuel delivered to the aircraft being refueled, he actuates the manually operable means 129 to the fuel delivered position.

Manually operable means 129 in the fuel delivered position causes the motor 18 to be connected in a reverse manner to the output of amplifier 17. With the motor connected in this manner, a negative signal applied to the input of amplifier 17 will now cause motor 18 to position indicating pointer 140 and potentiometer tap 142 in a downward direction.

Switch blades 130 and 131 in the fuel delivered position reverse the connection of the resistance element of potentiometer 143 to the lower terminal and the tap 150 of secondary 122. In other words, the upper terminal of the resistance element of potentiometer 143 is now connected by switch blade 130 to the lower terminal of secondary 122 while the lower terminal of the resistance element is connected by means of switch blade 131 to the tap 150.

Switch blade 132 in the second or fuel delivered position connects the conductor 158 to the movable tap 136 of potentiometer 128.

The switch blades 154 and 155 in the fuel delivered position reverse the connections of these switch blades to conductor 156 and conductor 158. In other words, conductor 158 is now connected to switch blade 154 and conductor 156 is now connected to switch blade 155.

With the apparatus as shown in Figure 9, the fuel tank 120 is half full and the system is at balance with the indicator 140 indicating the half full condition. When the manually operable means 129 is switched to the fuel delivered position an unbalance signal is immediately fed to the input of amplifier 17. This can be seen by tracing a circuit from ground connection 151 through conductor 160, switch blade 131, through a voltage drop in the lower portion of resistance element of potentiometer 143, conductor 153, switch blade 154, conductor 161, switch blade 132, through a voltage rise in the upper portion of resistance element of potentiometer 128, conductor 162, conductor 156, conductor 163, switch blade 155, capacitor 144, and conductor 159 to the terminal 125. It can be seen that in this circuit the potential across the lower portion of the resistance element of potentiometer 143 is a voltage drop while the potential across the upper portion of the potentiometer 128 is a voltage rise. The net effect is to apply a positive voltage to the input of amplifier 17 which causes motor 18 to be actuated to position indicating pointer 140 and potentiometer tap 142 in an upward direction. The extent of movement in the upward direction is dependent upon the voltage drop necessary in circuit with the voltage rise of the upper portion of potentiometer 128 to again bring the system into balance. This is controlled by the position of the second manually operable means 135. Therefore, the operator can actuate member 135 and view indicating pointer 140 to observe when the pointer reaches the zero position.

Fuel tank 120 is half full in this condition; however, the indicating pointer 140 indicates that there is no fuel present. When fuel is subsequently withdrawn from the tank 120 a negative signal is applied to the input of amplifier 17 since the positive signal applied to terminal 125 decreases with a decreasing amount of fuel in the fuel tank 120. This causes motor 18 to be actuated to position indicating pointer 140 and potentiometer tap 142 in a downward direction. As potentiometer tap 142 moves in a downward direction the voltage rise present in the above traced circuit is decreased to the point where the negative signal applied to terminal 125 is equal to the positive voltage applied to this terminal from the capacity bridge. Indicating pointer 140 in this condition indicates the quantity of fuel which has been withdrawn from the fuel tank 120.

It is also possible for the operator to indicate the fuel to be delivered by movement of the manually operable means 129 to the fuel to be delivered position. In this position the operator causes the indicating pointer 140 to indicate a predetermined amount of fuel which he subsequently will have pumped to the aircraft being refueled.

With switch blades 133 and 134 positioned in the fuel to be delivered position the output of amplifier 17 is once again connected to motor 18 in a manner so that a negative signal to the input of amplifier 17 causes motor 18 to be actuated to move indicating pointer 140 and potentiometer tap 142 in an upward direction.

Switch blades 130 and 131 in the fuel to be delivered position connect the resistance element of potentiometer 143 to the lower terminal and to the tap of secondary 122 in the manner first described. In other words, the upper terminal of potentiometer 143 is connected to the tap 150 while the lower terminal is connected to the lower terminal of the secondary 122.

The movement of switch blades 154 and 155 to the fuel to be delivered position once again connects switch blade 155 to conductor 158 and switch blade 154 to conductor 156.

If it is assumed that the apparatus of Figure 9 is switched from the fuel remaining position to the fuel to be delivered position, it can be seen that a negative signal is applied to the input of amplifier 17 and motor 18 moves potentiometer tap 142 and indicating pointer 140 in an upward direction to a new balance point. This can be seen by tracing a circuit from ground connection 151 through conductor 170, switch blade 130, through a voltage drop in the upper portion of potentiometer 143, conductor 153, switch blade 154, conductor 156, conductor 162, through a voltage drop in the upper portion of potentiometer 128, switch blade 132, conductor 158, switch blade 155, capacitor 144, and conductor 159 to terminal 125. The extent of upward movement of indicating pointer 140 and potentiometer tap 142 is controlled by the position of tap 136 of potentiometer 128. Therefore, the operator by movement of the manually operable means 135 can observe the movement of indicating pointer 140 and cause indicating pointer 140 to move to indicate a predetermined quantity of fuel which he subsequently desires to have pumped to an aircraft to be refueled.

As fuel is subsequently withdrawn from the fuel tank 120, a net negative signal is applied to the input of amplifier 17 and motor 18 causes potentiometer tap 142 and indicating pointer 140 to move in an upward direction. The operator observes movement of the indicating pointer 140 until the pointer reaches the zero point and he then stops the pumping operation knowing that the predetermined amount of fuel has been delivered to the aircraft being refueled. The pumping operation can also be stopped automatically.

From the above description it can be seen that an apparatus for use with fluid storage means is provided which is particularly adapted as an in-flight refueling apparatus for use with tanker type aircraft to selectively indicate the fuel remaining in the tanker aircraft, the fuel subsequently delivered from the tanker aircraft, or the fuel to be subsequently delivered from the tanker aircraft.

These and other modifications of the present invention will be apparent to those skilled in the art and it is intended that the present invention be limited solely by the scope of the appended claims.

I claim as my invention:

1. Supervisory apparatus for use with liquid storage means comprising; liquid quantity sensing means associated with the storage means to provide a signal voltage of a first sense indicative of the quantity of liquid therein; first manually operable means having three positions of operation, a source of voltage, a potentiometer having a resistance element and a movable tap, circuit means controlled by said first manually operable means connecting the resistance element of said potentiometer to said source of voltage in a first manner when said first manually operable means is in the first or third position and connecting the resistance element in a second manner when said first manually operable means is in the second position, the voltage on said potentiometer tap being of an opposite sense to said first sense when the first manually operable means is in the first or third position and being of said first sense when the first manually operable means is in the second position; a further source of voltage, second manually operable means connected to control the magnitude of the voltage of said further source of voltage; circuit means controlled by said first manually operable means to connect said further source of voltage to said potentiometer to effect the voltage at the tap thereof, said last named circuit being effective only when said first manually movable means is in said second and third position; voltage responsive indicating means connected to control the position of said potentiometer tap and having means to indicate liquid quantity, and circuit means connecting said quantity sensing means and said potentiometer tap to said voltage responsive means to apply a resultant signal voltage thereto, said voltage responsive means being effective to move said potentiometer tap to reduce said resultant voltage substantially to zero whenever it is other than zero, said indicator indicating liquid quantity in the storage means when said first manually operable means is in the first position, said indicator being caused to read zero quantity by movement of said second manually operable means when said first manually operable means is in the second position and to subsequently indicate the quantity of liquid withdrawn from the liquid storage means, and said indicator being caused to read a predetermined quantity to be subsequently withdrawn from the liquid storage means by movement of said second manually operable means when said first manually operable means is in the third position and to subsequently indicate zero when this predetermined quantity has been withdrawn from the liquid storage means.

2. Supervisory apparatus for use with a tanker type vehicle having fuel storage means, comprising; fuel quantity sensing means associated with the fuel storage means and arranged to derive an alternating current signal voltage of a first phase with respect to a reference potential and of a magnitude indicative of the quantity of fuel in the storage means; a transformer having a tapped secondary and end terminals, a first and a second potentiometer each having a resistance element and a movable tap cooperating therewith, manually operable means having three positions of operation; circuit means controlled by said manually operable means in the first position connecting said first potentiometer resistance element in a first manner to one of the end terminals and the tap of said secondary and connecting said secondary tap to the reference potential in a manner to place an alternating current voltage of a second phase in said first potentiometer tap; circuit means controlled by said manually operable means in the second position connecting said first potentiometer resistance element in a reverse manner to said one end terminal and tap of said secondary and connecting said second potentiometer resistance element in a first manner to said one end terminal and tap of said secondary and connecting said second potentiometer tap to the reference potential so that the circuit from said first potentiometer tap to the reference potential includes said second potentiometer tap and the voltages thereon are in opposing relationship; circuit means controlled by said manually operable means in the third position connecting said first potentiometer resistance element in said first manner to said end terminal and tap of said secondary and connecting said second potentiometer resistance element to said tap and the other end terminal of said potentiometer and connecting said second potentiometer tap to the reference potential so that the circuit from said first potentiometer tap to the reference potential includes said second potentiometer tap and the voltages thereon are in aiding relationship; an amplifier sensitive to the phase and magnitude of an input signal and providing an output of a first or second characteristic in accordance with the phase or the input signal, a reversible motor, circuit means controlled by said manually operable means connecting said motor to the input of said amplifier in a first manner when said first manually operable means is in the first or third position and reversing the connection when in the second position, means connecting said motor to control the position of said first potentiometer tap; circuit means connecting said first potentiometer tap and said sensing means to said amplifier to apply an input signal thereto; further manually operable means for controlling the position of said second potentiometer tap; and indicating means controlled by said motor, said indicating means selectively indicating total fuel quantity, fuel delivered, and fuel to be delivered when said first mentioned manually operable means is in the first, second, or third positions respectively.

3. Supervisory apparatus for use with fluid storage means, comprising; fluid quality sensing means for deriving an alternating current signal of a first phase with respect to a reference point and of a magnitude indicative of the quantity of fluid in the storage means; a transformer secondary having end terminals and a tap, first and second potentiometers having resistance elements and each having a movable tap cooperating therewith, circuit means connecting said resistance elements in series to said secondary end terminals and connecting said secondary tap to the connection of resistance elements; a third potentiometer having a resistance element and a movable tap cooperating therewith; manually operable means having three positions; circuit means controlled by said manually operable means in the first position to connect said third potentiometer resistance element in a first manner in parallel with said second potentiometer resistance element and to connect said transformer tap to the reference point to cause a voltage of a second phase to exist at said third potentiometer tap, circuit means controlled by said manually operable means in the second position to connect said third potentiometer resistance element in the opposite manner in parallel with said second potentiometer resistance element and to connect said tap of said second potentiometer to the reference point so that a circuit exists from said third potentiometer tap to said second potentiometer tap and then to the reference point with the voltages thereon being in opposition; circuit means controlled by said manually operable means in the third position to connect said third potentiometer resistance element in said first manner in parallel with said second potentiometer resistance element and to connect said first potentiometer tap to the reference point so that a circuit exists from said third potentiometer tap to said first potentiometer tap and then to the reference point with the voltages thereon being in aiding relationship to cause a voltage of said second phase to exist at said third potentiometer tap which is the sum of the voltages; an amplifier sensitive to the phase and magnitude of signals applied to the input thereof and having an output of a first or a second phase depending on the phase of input signal, reversible motor means connected to said amplifier to be controlled by the output thereof, means connecting said motor means to said third potentiometer tap to control the position thereof, indicator means controlled by said motor means; means connecting said quantity sensing means and said third potentiometer tap to the input of said amplifier; and further manually operable means to jointly control said first and second potentiometer taps to control the voltages thereon, said indicating means selectively indicating total fluid quantity, fluid quantity delivered, or fluid quantity to be delivered for the storage means in said first mentioned manually operable means is in said first, second, or third position respectively.

4. Supervisory apparatus for use with liquid storage means comprising; a first transformer with a pair of terminals and a tap therebetween, means connecting said tap to a reference point, liquid quantity sensing means connected to one of the terminals of said transformer and associated with the storage means to derive a signal of a first phase with respect to the reference point and of a magnitude indicative of the quantity of liquid in the storage means; a second transformer having a pair of terminals, a first potentiometer having a resistance element and a tap, a second potentiometer having a resistance element and a tap, means connecting said second potentiometer resistance element to the terminals of said second transformer, first manually operable means having three positions of operation, second manually operable means connected to control the position of said second potentiometer tap; amplifier means sensitive to the phase and magnitude of an input signal and having an output of one or the other phase dependent upon the phase of the input signal, reversible motor means connected to the output of said amplifier, means connecting said motor means to control the position of said first potentiometer tap, indicator means connected to be controlled by said motor means; circuit means connecting said quantity sensing means to the input of said amplifier to apply a signal of a first phase thereto; circuit means controlled by said first manually operable means in first position to connect said first potentiometer resistance element in a first manner to the other terminal and the tap of said first transformer and to connect said tap of said first potentiometer to the input of said amplifier to apply a signal of a second phase thereto to cause said indicator to indicate the total liquid quantity in the storage means; circuit means controlled by said first manually operable means in the second position to reverse the manner of connection of said first potentiometer resistance element to the other terminal and the tap of said first transformer and to connect one terminal of said second transformer and said second potentiometer tap in series opposition to said first potentiometer tap to cause said indicator to indicate zero liquid quantity in response to movement of said second manually operable means and to subsequently indicate the quantity of liquid withdrawn from the storage means; and circuit means controlled by said first manually operable means in the third position to connect said first potentiometer resistance element in said first manner to the other terminal and the tap of said first transformer and to connect said one terminal of said second transformer and said second potentiometer tap in series aiding to said first potentiometer tap to cause said indicator to indicate a predetermined liquid quantity in response to movement of said second manually operable means and to subsequently indicate lesser quantities of liquid as liquid is withdrawn from the storage means.

5. Supervisory apparatus for use with fluid storage means comprising: fluid quantity sensing means arranged to derive a signal of a first sense indicative of the fluid quantity in the storage means; signal responsive means connected to said quantity sensing means to be controlled by said signal, indicating means controlled by said signal responsive means and having indicia of fluid quantity; a first signal source having an output whose magnitude is controlled by said signal responsive means, first control means for controlling the sense of the output signal of said first signal source; a second signal source having an output of a second sense, second control means for controlling the magnitude of the output signal of said second signal source; first means, including said first control means arranged to cause the output signal of said first signal source to be of said second sense, connecting said first signal source to said signal responsive means to cause said indicating means to indicate the quantity of fluid in the storage means; second means, including said first control means arranged to cause the output signal of said first signal source to be of said first sense, connecting said first and second signal sources in opposing relationship to said signal responsive means whereby said second control means is effective to cause said indicating means to read zero quantity of fluid and to subsequently read the quantity of fluid delivered from the storage means; and third means, including said first control means arranged to cause the output signal of said first signal source to be of said second sense, connecting said first and second signal sources in aiding relationship to said signal responsive means whereby said second control means is effective to cause said indicating means to read the quantity of fluid to be delivered from the storage means.

6. Supervisory apparatus for use with fluid storage means comprising; electrical means arranged to derive a signal voltage of a first sense indicative of the total fluid quantity in the fluid storage means, voltage responsive means having an indicator calibrated in terms of fluid quantity, circuit means connecting said electrical means to said voltage responsive means to apply said signal voltage thereto; a first source of voltage having an output voltage magnitude controlled by said voltage responsive means and having an output voltage which is selectively of said first or a second sense; a second source of voltage having an output voltage of said second sense, control means for controlling the magnitude of the output voltage of said second source of voltage; and means selectively connecting said first source of voltage, when of said second sense, to said voltage responsive means to cause said indicator to read the quantity of fluid in the storage means; or connecting said first source of voltage, when of said first sense, and said second source of voltage in opposing relationship to said voltage responsive means whereby said control means is effective to cause said indicator to read the quantity of fluid delivered from the storage means; or connecting said first source of voltage, when of said second sense, and said second source of voltage in aiding relationship to said voltage responsive means whereby said control means is effective to cause said indicator to read the quantity of fluid subsequently to be delivered from the storage means.

7. Apparatus for use with fluid storage means comprising; fluid quantity sensing means arranged to sense the quantity of fluid in the storage means and to provide an alternating current output voltage of a first phase and of a magnitude indicative of the fluid quantity; a first source of alternating current voltage, first control means for selectively causing said first source of alternating current voltage to have an output of said first or an opposite phase; a second source of alternating current voltage having an output of said opposite phase, second control means for controlling the magnitude of the output of said second source of alternating current voltage; phase responsive motor means, fluid quantity indicator means connected to be controlled by said motor means; means, including said first control means selectively causing said first alternating current voltage to have an output of said opposite phase and connecting said fluid quantity sensing means and said first source of alternating current voltage of said opposite phase to said motor means in a manner to cause said indicator to continuously read the quantity of fluid in the storage means; or causing said first alternating current voltage source to have an output of said opposite phase and connecting said fluid quantity sensing means and said first and second sources of alternating current voltage to said motor means in a manner to cause said indicator to read zero as said second control means is actuated to cause the magnitude of the output of said second source of alternating current to be equal to the sum of the output of said first source of voltage and the output of said fluid quantity sensing means, and to then continuously read the quantity of fluid which is withdrawn from the storage means; or causing said first alternating current voltage source to have an output of said first phase and connecting said fluid quantity sensing means and said first and second sources of alternating current voltage to said motor means in a manner to cause said indicator to read the quantity of fluid to be subsequently delivered from the storage means as determined by said second control means and to then continuously read the quantity of fluid left to be delivered until said indicator reads zero when the desired quantity of fluid has been delivered.

8. Apparatus for use with fluid storage means comprising; fluid quantity sensing means for deriving a signal of a first sense and of a magnitude indicative of the quantity of fluid in the storage means, signal responsive indicating means connected to said sensing means and having movable means controlled in accordance with the signal applied to said responsive means; a first signal source having an output signal whose magnitude is controlled by said movable means of said signal responsive indicating means, first control means having three operative conditions and being effective in the first and third conditions to cause a signal of a second sense to be present at the output of said first signal source and being effective in the second condition to cause a signal of said first sense to be present at the output; a second signal source, having an output signal of said second sense, second control means arranged to control the magnitude of the output signal of said second signal source; means including said first control means in the first operative condition connecting the output of said first signal source to said signal responsive means to thereby cause said indicating means to indicate the total quantity of fluid in the storage means; means including said first control means in the second operative condition connecting the outputs of said first and second signal sources in opposing relationship to said signal responsive means, said second control means being effective to cause said indicating means to read zero fluid quantity and to subsequently read the quantity of fluid delivered from the storage means; and means including said first control means in the third operative condition connecting the outputs of said first and second signal sources in aiding relationship to said signal responsive means, said second control means being effective to cause said indicating means to read the quantity of fluid it is desired to subsequently deliver from the storage means and subsequent thereto to read zero fluid quantity when such quantity has been delivered from the storage means.

9. Apparatus for use with a tanker type aircraft having fuel storage means, comprising; means associated with said storage means for deriving a signal voltage of a first sense and of a magnitude indicative of the quantity of fuel in the storage means, voltage responsive means connected to said first named means to be controlled by said signal voltage, indicating means connected to said voltage responsive means to be controlled thereby and having indicia of fuel quantity; a first source of voltage having two terminals, a potentiometer having a resistance element, a tap cooperating therewith, means connecting said potentiometer tap to be positioned by said indicator, first control means having three positions, circuit means controlled by said first control means connecting said potentiometer resistance element between the two terminals of said first source of voltage and controlling the sense of the voltage on said potentiometer tap; a second source of voltage of a sense opposite to said first sense, second control means for controlling the output magnitude of said second source of voltage; means controlled by said first control means in said first position connecting said potentiometer resistance element to said first source of voltage in a manner to cause the voltage on said potentiometer tap to be of said opposite phase and connecting said potentiometer tap to said voltage responsive means to cause said indicator to read the quantity of fuel in the storage means; means controlled by said first control means in said second position connecting said potentiometer resistance element to said first source of voltage in a manner to cause the voltage on said potentiometer tap to be of said first phase and connecting said potentiometer tap and said further voltage source to said voltage responsive means whereby said second control means is effective to cause said indicator to read zero fuel quantity and to subsequently read the quantity of fuel delivered from the storage means; and means controlled by said first control means in said third position connecting said potentiometer resistance element to said first source of voltage in a manner to cause the voltage on said potentiometer tap to be of said opposite phase and connecting said potentiometer tap and said further voltage source to said voltage responsive means whereby said second control means is effective to cause said indicator to read a quantity of fuel it is desired to deliver from the fuel storage means and to subsequently read the portion of this quantity which remains to be delivered.

10. Apparatus for use with a tanker type aircraft having fuel storage means from which fuel is delivered to other aircraft, comprising; electrical means associated with said storage means and deriving an alternating current signal voltage of a first phase indicative of the fuel quantity in the storage means, voltage responsive means having an indicator calibrated in terms of fuel quantity, means connecting said electrical means to said voltage responsive means to apply said signal voltage thereto; a potentiometer having an impedance element and a moveable tap, a source of alternating current voltage having two terminals, first manually operable means having three operative positions, means connecting said potentiometer impedance element between the two terminals of said source of alternating current voltage by means of a circuit which includes said first manually operable means, said first manually operable means controlling the phase of the voltage applied to said potentiometer, a further source of alternating current voltage of a phase opposite to said first phase, second manually operable means for controlling the amplitude of the output voltage of said further source of voltage; circuit means controlled by said first manually operable means in the first position connecting said potentiometer tap to said voltage responsive means and operative to cause the voltage on said potentiometer tap to be of said phase opposite to said first phase; circuit means controlled by said second manually operable means and by said first manually operable means in said second position operative to cause the voltage on said potentiometer tap to be of said first phase and connecting said potentiometer tap and said further source of alternating current voltage to said voltage responsive means; and further circuit means controlled by said second manually operable means and by said first manually operable means in said third position operative to cause the voltage on said potentiometer tap to be of said second phase and connecting said potentiometer tap and said further source of alternating current voltage to said voltage responsive means; said indicator indicating the total fuel in the storage means, the fuel delivered to another aircraft, or the fuel to be delivered to another aircraft when said first manually operable means is in the first, second or third position respectively.

11. Supervisory apparatus for use with fluid storage means comprising: a source of alternating voltage having a first terminal connected to a reference potential and having a second terminal of a first phase, impedance type fluid quantity sensing means arranged to be positioned in the fluid storage means and to have an impedance value indicative of the quantity of fluid in the storage means, voltage responsive means having a first input terminal connected to said reference potential and having a second input terminal, means connecting said second terminal of said voltage responsive means in a series circuit with said sensing means and said second terminal of said source of alternating voltage to thereby apply to the input of said voltage responsive means a signal of said first phase and of a magnitude indicative of the quantity of fluid in the storage means; a second source of alternating voltage having two terminals, a first potentiometer having a resistance element connected between the two terminals of said second source of alternating voltage and having a movable tap, a second potentiometer having a resistance element and a movable tap; first manually operable means having a first and a second position, said first manually operable means in said first position connecting the resistance element of said second potentiometer between the two terminals of said second source of alternating voltage and connecting one terminal of the resistance element of said second potentiometer to said reference potential in a manner to apply a voltage of a phase opposite to said first phase to the movable wiper of said second potentiometer; means connecting the movable wiper of said second potentiometer to said second input terminal of said voltage responsive means to thereby apply a rebalance voltage to the input of said voltage responsive means, motor means connected to the output of said voltage responsive means to control the position of the potentiometer tap of said second potentiometer, the position of the tap of said second potentiometer then being indicative of the quantity of fluid in the storage means and movable in a first direction upon fluid being withdrawn from the storage means; means including said first manually operable means in the second position connecting the resistance element of said second potentiometer in a reverse manner to said second alternating voltage source, disconnecting the said one terminal of the resistance element of said second potentiometer from said reference potential, connecting said movable tap of said first potentiometer to said reference potential, and reversing the operation of said motor means as controlled by the output of said voltage responsive means; second manually operable means arranged to vary the position of said first potentiometer tap and thereby to cause movement of said second potentiometer tap as said motor means operates, said second potentiometer tap thereafter moving in said first direction when liquid is added to said storage means and moving in the opposite direction when fluid is withdrawn from said storage means.

References Cited in the file of this patent

UNITED STATES PATENTS

| | | |
|---|---|---|
| 2,563,280 | Schafer | Aug. 7, 1951 |
| 2,563,281 | Griffith | Aug. 7, 1951 |
| 2,656,977 | Cummings | Oct. 27, 1953 |